United States Patent [19]

Baines

[11] Patent Number: 5,188,331
[45] Date of Patent: Feb. 23, 1993

[54] UMBRELLA SUPPORT BRACKET

[76] Inventor: Gurney D. Baines, P.O. Box 297, Pinehurst, N.C. 28374

[21] Appl. No.: 802,869

[22] Filed: Dec. 6, 1991

[51] Int. Cl.⁵ .............................................. A01K 97/10
[52] U.S. Cl. ..................................... 248/538; 135/16; 135/88; 248/354.4
[58] Field of Search ............... 248/511, 514, 528, 534, 248/538, 354.1, 351, 354.4; 135/16, 88; 224/329, 314; 403/378, 379

[56] References Cited

U.S. PATENT DOCUMENTS

| | | | |
|---|---|---|---|
| 1,790,851 | 2/1931 | Weaver | 248/354.1 X |
| 2,483,478 | 10/1949 | Smelker | 135/88 |
| 2,625,165 | 1/1953 | Eskew | 135/88 X |
| 2,681,240 | 6/1954 | Brandenburg | 403/378 |
| 3,765,434 | 10/1973 | Riggs | 135/16 X |
| 4,124,240 | 11/1978 | Adelberg | 248/351 X |
| 4,519,409 | 5/1985 | Kinney | 135/88 |
| 5,046,446 | 9/1991 | Sumrall | 135/16 |

FOREIGN PATENT DOCUMENTS

| | | | |
|---|---|---|---|
| 518237 | 2/1931 | Fed. Rep. of Germany | 248/514 |
| 1516096 | 3/1968 | France | 135/88 |

Primary Examiner—J. Franklin Foss
Attorney, Agent, or Firm—Olive & Olive

[57] ABSTRACT

The invention provides an umbrella support bracket for holding an umbrella over the head of a user who is loading or unloading the trunk of an automobile. The device comprises a central telescoping adjustable post having an angularly adjustable arm on which to mount the umbrella. The adjustable telescoping post is clampable in its adjusted length. The post has upper and lower pads to prevent physical damage to the parts contacted and to prevent sliding. The angularly adjustable arm has a resilient clip to hold the shaft of the umbrella, a sling to hold the handle of the umbrella, and two straps to secure the grip on the umbrella. After initial adjustments are accomplished, mounting and removal may be done with one hand while holding an umbrella in the other hand.

13 Claims, 2 Drawing Sheets

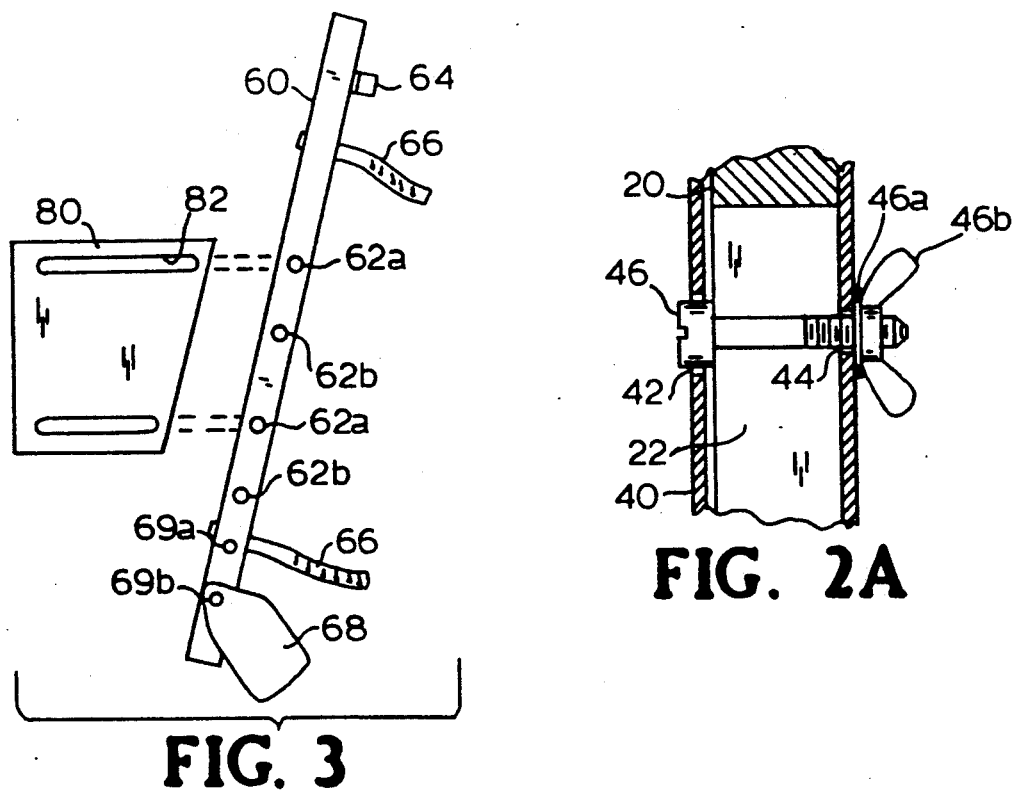
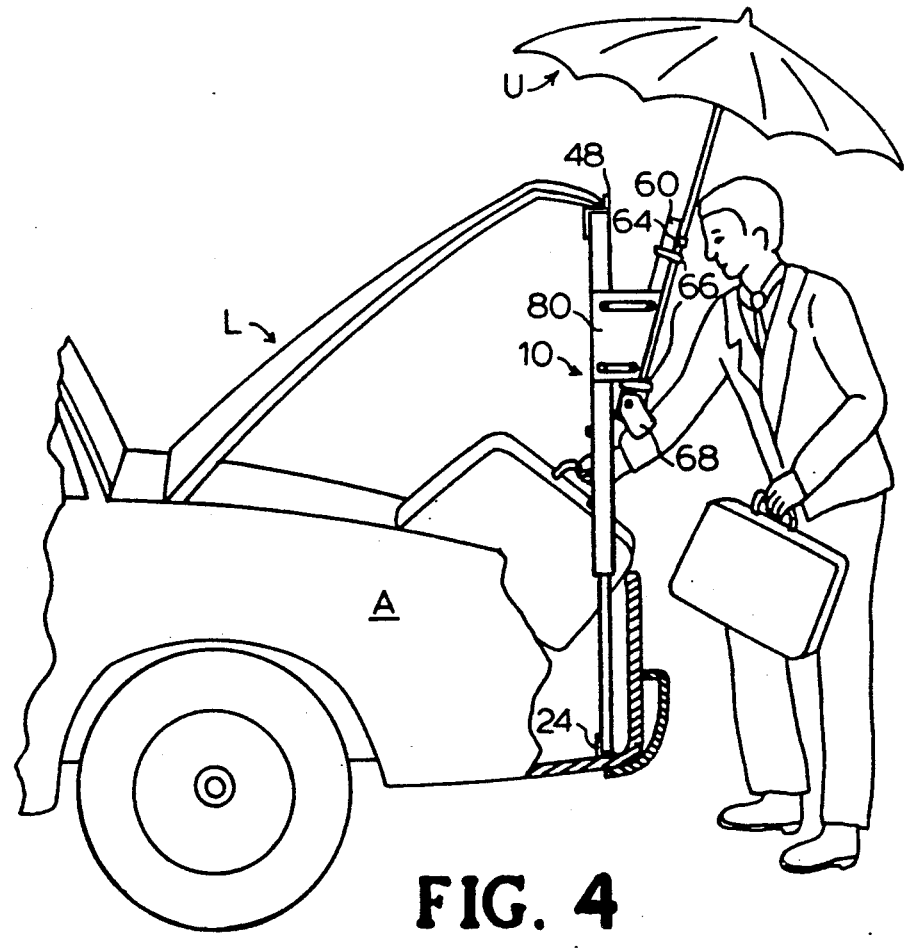

UMBRELLA SUPPORT BRACKET

FIELD OF THE INVENTION

This invention relates to the field of supportive devices for an umbrella and more particularly to an umbrella support which is attachable to the trunk of a passenger automobile.

BACKGROUND OF THE INVENTION

Many devices have been designed for the support of an umbrella, ranging from a patio table with a built-in umbrella stand to a hat with an umbrella top surface. Some are intended for protection from rain, some for sun, and some are usable for either element. Generally, an umbrella may be described as having a shaft with an upper and a lower end, a handle being mounted on the lower end and a canopy being mounted on the upper end.

One situation in which an umbrella is useful and in which the umbrella should be supported without use of the hands of the person being protected arises when a person is packing or unpacking the trunk of an automobile during rain or snow. In this situation, it is often necessary to use two hands to maneuver the cargo being loaded or unloaded. In particular, in the case of a salesman who may store literature and samples of merchandise in the car's trunk, a device which would support an umbrella over the head of the salesman while leaving both of the saleman's hands free would be a useful improvement in the art.

Therefore, it is an object of the present invention to provide a device to support an umbrella adjacent the open trunk of an automobile to protect an individual who is loading or unloading the trunk from precipitation.

It is an additional object of the invention to provide a device to support an umbrella adjacent the open trunk of an automobile which device is capable of adjustment to fit the trunk opening size.

It is an additional object of the invention to provide an umbrella support which is capable of adjustment in the position of the umbrella relative to the individual so as to provide optimum protection from precipitation.

It is an additional object of the invention that an adjustable umbrella support be provided which is capable of being mounted or removed without disturbing the adjustment settings.

The foregoing and other objects will become apparent to those skilled in the art through the disclosure following.

SUMMARY OF THE INVENTION

The invention disclosed provides a device in the form of an umbrella support bracket adapted for holding an umbrella above the head of a user independent of any hand support of the umbrella when the user is adjacent the open trunk of an automobile. The umbrella support bracket in the illustrative embodiment disclosed comprises a telescoping adjustable length post having an umbrella supporting arm mounted on an outwardly facing side of the post. The post is adjusted and clamped in length so that while a lower end of the post rests on the floor of the trunk, an upper end engages the open trunk lid edge and is held in position thereby. The umbrella handle and shaft are then placed into releasable engagement with the supporting arm which may be separately adjusted to position the umbrella canopy advantageously relative to the individual being sheltered from precipitation. The umbrella support device disclosed can be installed or removed with one hand, after the initial adjustments are made, while the individual holds an umbrella in the other hand, so as to keep the user dry both during installation of the device and use of the device.

BRIEF DESCRIPTION OF THE DRAWINGS

FIG. 2A is a partial section view of the assembled telescoping post of the invention taken through the clamping area and showing the relation of the inner and outer post members in the vicinity of the clamping means.

FIG. 3 is an elevation exploded view of the umbrella support arm and one of a pair of side plates aligned to mate with holes on the support arm.

FIG. 4 is a cut-away elevation view showing a typical rear trunk portion of an automobile with trunk lid raised and the umbrella support bracket of the invention mounted between the trunk floor and the trunk lid and supporting an umbrella over the head of a user.

DESCRIPTION OF THE PREFERRED EMBODIMENT

The invention disclosed herein provides an umbrella holder adapted so as to free the arms of the umbrella user when loading or unloading the trunk of an automobile. The invention recognizes that an umbrella support device which will be adaptable to a large variety of automobile trunks and a large variety of umbrellas must be adjustable in length, position and angle, as well as able to hold different umbrellas securely. The invention also recognizes that, once the basic adjustments are set for a particular automobile and a particular umbrella, it is advantageous for those adjustments to be left fixed indefinitely.

Figure 1:
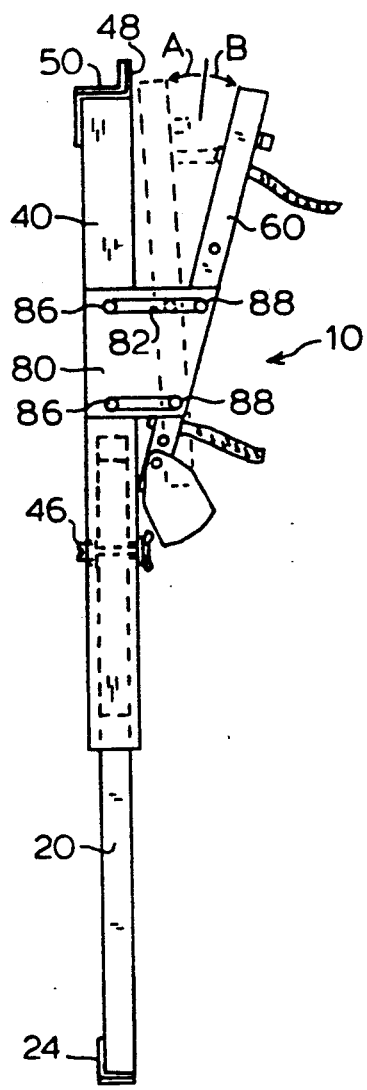
FIG. 1 is a side elevation view of the fully assembled umbrella support bracket of the invention.

FIG. 1 portrays umbrella support bracket 10 being made up of four major components, all of which are adjustable relative to one another. Telescoping inner post member 20 is operative to support the additional components above the floor of an automobile trunk. Telescoping outer post member 40 is hollow and is adapted to encompass inner post member 20 and to mount the upper components of the invention. When assembled, the composite of inner post member 20 and outer post member 40 becomes compound post 20, 40. Umbrella mounting arm 60 holds the handle and shaft of an umbrella when mounted adjacent the open trunk. A pair of adjusting plates 80 mount on two opposite sides of outer post member 40 and arm 60. Plates 80 are configured to allow angular and lateral adjustment of mounting arm 60 and the umbrella attached thereto so as to compensate for different trunk lid opening positions. Arm 60 is shown n FIG. 1 in solid lines at one extreme of its angular adjustment and in dashed lines at the other extreme of its angular adjustment. In the preferred embodiment, inner post member 20, outer post member 40 and mounting arm 60 are square in cross-section, though other configurations would be adaptable to the same functions.

Plates 80, shown in detail in FIG. 3, are each formed in the shape of a truncated right triangle with slots 82 perpendicular to the vertical side thereof. The normal orientation of plates 80 for use according to the preferred embodiment is with plates 80 in vertical planes and the two parallel edges of each plate 80 in substantially horizontal positions, the longer horizontal edge being above the shorter edge. Plates 80 are assembled to outer post member 40 with a pair of screws 86 which pass through respective slots 82. Screws 86 are passed through respective slots 82 in first plate 80, through mating holes 62 in outer post member 40 in appropriate location, and through slots 82 in the opposite plate 80, terminating with a nut on each of the screws 86. Similarly, arm 60 is assembled to both plates 80 at the opposite ends of slots 82 by means of screws 88. Slots 82 are formed wider than the shank diameters of screws 86, 88 so as to allow greater angular adjustability, recognizing that movement of the upper end of arm 60 follows an arcuate path relative to the stationary lower end of arm 60. This wide slot angular adjustability arrangement results in variability of arm angle A, B (FIG. 1) on both sides of a line parallel to post 40. To ensure secure locking of these components in the adjusted position, screws 86, 88 are fitted with flat washers on each outer end thereof.

Normally, adjusting of arm 60 requires only loosening of screws 88 which allows for angular and lateral movement. It may be preferred at some times to move arm 60 only in a direction parallel to slots 82 without changing the mounting angle of the umbrella. In this circumstance, it is possible to loosen screws 86 only and to move plates 80 a distance past screws 86 without changing the adjustment of arm 60 relative to plates 80. However, normally adjustment will be accomplished by screws 88 to vary the angle and/or the lateral position of arm 60.

Arm 60, as shown in FIG. 3, has a series of holes adapted for the attachment of plates 80, two of which holes are labelled 62a and two are labelled 62b. It will be noticed that the pair of holes designated 62a are spaced apart by a distance equal to the perpendicular distance between slots 82 of plates 80, and similarly, holes set 62b have the same spacing at different levels. Thus, if it is preferred, arm 60 may be mounted to plates 80 at the level of holes 62a in which case the umbrella canopy will be relatively low, or at the level of holes 62b in which case the umbrella canopy will be relatively high. Fixedly attached near the upper end of arm 60 on an outwardly facing surface is resilient clip 64 which is formed to surround and grasp the shaft of an umbrella inserted therein. Clip 64 is, in the preferred embodiment, shaped as a hollow circular cylinder with a small portion of the cylinder wall removed to allow the umbrella shaft to be snapped in place within clip 64. Clip 64 is made of a resilient plastic material. Straps 66 are attached to a surface of arm 60 which is opposite the surface to which clip 64 is attached so as to be wrapped around the umbrella shaft and be easily secured, for example, with a hook-and-loop Velcro ® type material. Straps 66 are flexible and are mounted on arm 60 at positions which permit them to be wrapped around arm 60 without interfering with plates 80 assembled thereto. For further support a sling 68 is assembled to the sides of arm 60 in a position to accept and support the lower end of the umbrella handle. Sling 68 also has two possible points of attachment 69a, 69b so as to afford a further adjustability option to the user.

Figure 2B:
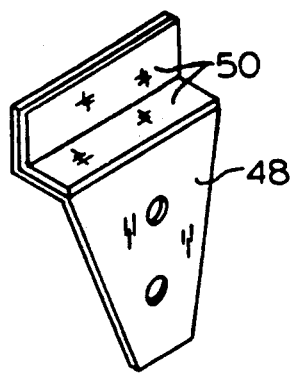
FIG. 2B is a detailed perspective view of the upper support mounting member so as to show the resilient frictional pads mounted thereon.
Figure 2:
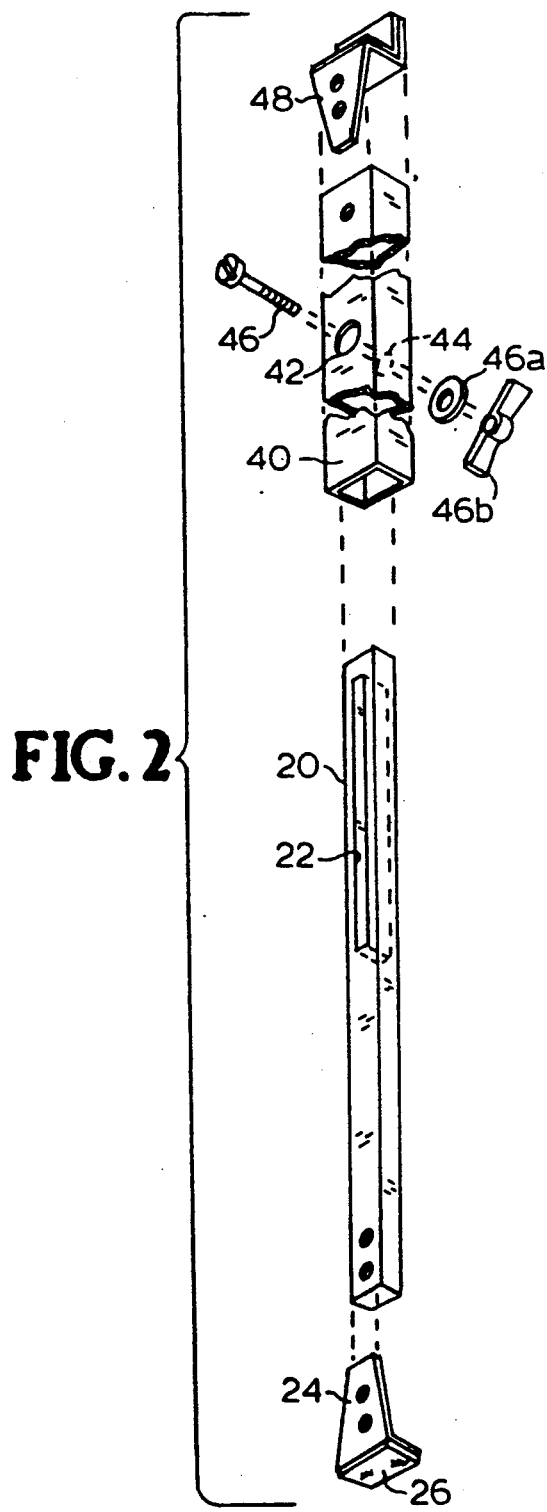
FIG. 2 is an exploded perspective view of the telescoping post of the invention including its inner and outer post members and upper and lower mounting pad members.

Additional adjustability involves the total length of umbrella support bracket 10 so as to fit the opening of the trunk. As is recognized by the present invention, automobiles differ in the size of their trunk openings as well as the shape of their trunk lids. To accommodate this range of differences, the length of compound post 20, 40 is made to be adjustable. According to the preferred embodiment, outer post member 40 is a hollow, square tube configured to slip over inner square post member 20 in sliding relation. As shown in FIG. 2, inner post member 20 is solid, square in cross section and formed with an elongate slot 22 which passes through post member 20 from one to another parallel face thereof. Outer post member 40 is formed with large hole 42 through one panel and small hole 44 through a parallel panel, both holes being in axial alignment with each other. The diameter of large hole 42 is larger than the diameter of the head of clamping screw 46. The width of slot 22 in post member 20 and the diameter of small hole 44 are each large enough to freely pass the shank of clamping screw 46, but not to pass the head of screw 46. On assembly, as illustrated in FIG. 2A, inner post member 20 is placed within outer post member 40 so that slot 22 is aligned with holes 42, 44. Screw 46 is passed through hole 42, slot 22 and hole 44 and is then fastened with washer 46a and wing nut 46b. Upon tightening wing nut 46b, screw 46 claps inner post member 20 against the inside of outer post member 40 without the possibility of bending tubular outer post member 40.

As further portrayed in FIG. 2, a support base 24 is assembled by means of screws or rivets (not shown) to the lower end of inner post member 20 and comprises a member having a planar portion which is perpendicular to the long axis of post member 20. Compressible pad 26 is adhesively affixed to the lower side of the perpendicular flat surface of base 24. Pad 26 is made of a material capable of increasing the friction between base 24 and the surface on which it stands while not damaging or scratching this surface, for example a soft rubber material. Support 48 is assembled to the top of post member 40 in similar fashion to the attachment arrangement of base 24 to the bottom of post member 20. Support 48 has an attachment portion parallel to the axis of post member 40, a flat surface perpendicular to the axis of post member 40 and a further flat surface beyond the perpendicular surface which is extending upwardly parallel to, and offset from the axis. As shown in detail in FIG. 2B, both the perpendicular and the parallel extending surfaces are fitted with a protective pad 50 which exhibits the same material properties as pad 26. The configuration of support 48 is adapted to be positioned against the edge of the lid of an open automobile trunk without falling inwardly when the length of compound post 20, 40 is correctly adjusted. The configuration of both base 24 and support 48 are such that the weight bearing surfaces that are perpendicular to the axis of post 20, 40 are in line with post 20, 40 which allows the bracket of the invention to rely upon the strength of post 20, 40 to sustain any strain applied, not merely the strength of base 24 or support 48.

Having thus described the apparatus of the invention, attention is now directed to FIG. 4 so as to describe the method of use. As discussed above, the present invention is intended to protect an individual who is packing or unpacking articles from the trunk of a car from pre- cipitation, which packing activity typically requires the use of both hands. In this drawing, umbrella support 10 is shown in operative position in the open trunk of an automobile A while articles are being inserted or removed from the trunk by a person. The lower end of umbrella support bracket 10 is first placed into the open trunk with base 24 on the floor of the trunk. Next, the upper end of bracket 10 is moved toward the automobile so as to intercept the edge of trunk lid L with support 48. If the umbrella support 10 has not yet been adjusted for the height of trunk lid L, screw 46 must be loosened, compound post 20, 40 adjusted in length, and then screw 46 is retightened. The long slot 22 in inner post member 20 allows for adjustment in fine increments according to the height of trunk lid L. With slight upward pressure, trunk lid L is lifted and then placed down upon support 48 and pad 50. When trunk lid L is released, it will apply downward pressure to hold umbrella support bracket 10 firmly in place with the aid of cushioned, frictional pads 26, 50.

Once umbrella support 10 is secured in substantially vertical alignment at the opening of the automobile trunk, umbrella U is mounted. The mounting of opened umbrella U involves placing the umbrella handle down into sling 68, snapping the shaft into circular clip 64, and, optionally, clasping strap 66 securely around the shaft. To optimally position umbrella U over the person being sheltered, further adjustment may be made to arm 60 and plates 80 as described above. As shown, mounted umbrella U will offer a considerable protection to the user while leaving both hands unencumbered.

When the umbrella support 10 and the umbrella U are no longer needed, dismantling of the apparatus is quick and simple. One unclasps the Velcro ®-style straps 66 from around the shaft of umbrella U, snaps the umbrella shaft out of clip 64 and lifts the handle out of sling 68. If precipitation is still falling, the umbrella U may be held in one hand while umbrella support 10 is pulled outward at the top to release it from the holding pressure of trunk lid L with the other hand. Without upsetting any of the adjustments previously made, support 10 may be placed horizontally into the trunk and the lid L closed. Umbrella U can then be used while walking from the automobile to the user's destination.

Remounting umbrella support device 10 into the open trunk after the initial setting of the various adjustments is as easy as the act of removing it. One approaches the trunk with umbrella U in one hand. Next, the trunk lid L is raised and umbrella support 10 is removed from the trunk with the other hand. The bottom support base 24 is then placed on the floor of the trunk with the hand not holding umbrella U. With one hand on support 10 and the other hand holding umbrella U, the end of the handle of umbrella U is placed into sling 68 and the shaft is snapped into clip 64. Umbrella U is now being held free of the user's hands, although the user is holding umbrella support bracket 10 in place. With the hand that had been holding umbrella U, the trunk lid L is lifted against its spring resistance and umbrella support 10 is moved inwardly so that support 48 firmly engages the edge of trunk lid L. Umbrella U and support bracket 10 are now being held without the use of hands. Now, optionally, Velcro ® type straps 66 may be closed for greater security. Note that in the preferred embodiment, a golf style umbrella is used, which typically has a straight, rather than hooked handle and has a relatively large canopy area. Sling 68 is designed to accommodate such a straight handle, although a differently configured sling or a formed rigid brace could be used to accommodate a hooked or other shaped handle.

As described above, the umbrella support device of the invention, by holding an umbrella over the head of a user, provides simple and useful shelter from precipitation while one is loading or unloading the trunk of an automobile. A particular advantage of the umbrella support bracket described herein is inherent in its adjustability, which feature allows adaptation to a wide range of automobiles with different sized trunk openings and with different trunk lid shapes. The disclosure herein has been described in the form of a preferred embodiment, however it is recognized that certain variations of the design details may be possible. Variations and modifications to the basic principles are considered within the scope and spirit of the invention disclosed.

What is claimed is:

1. A bracket for supporting on the trunk portion of a vehicle having a trunk and a trunk lid an umbrella having a canopy supported by a shaft and a handle, comprising:
   (a) a post extending between upper and lower ends and formed at the upper end with means for engaging an outer edge portion of a raised trunk lid of said vehicle when the lower end of the post formed as a support base rests on the floor of the trunk of the vehicle and adapted for being maintained in a substantially vertical position when so positioned; and
   (b) support means mounted intermediate the length of and on the post and including releasable clamping means adapted to receive and hold a portion of an umbrella shaft at some selected angle relative to the post such that an umbrella canopy mounted on an upper portion of the umbrella shaft may reside above the trunk lid and in a position suitable to shelter an individual adjacent the trunk.

2. An umbrella supporting bracket as claimed in claim 1 wherein said post is formed in a manner enabling its length to be adjusted.

3. An umbrella supporting bracket as claimed in claim 2 wherein said post comprises a pair of telescoping post members operable to adjust the length of said post and means to lock said post members together in selected positions.

4. An umbrella supporting bracket as claimed in claim 1 wherein said support means is adjustable both laterally and angularly with respect to said post.

5. An umbrella supporting bracket as claimed in claim 1 wherein said support means includes first means for supporting a handle and second means for releasably grasping a shaft of said umbrella.

6. An umbrella supporting bracket as claimed in claim 1 further comprising resilient compressible covering pad means on the upper and lower ends of said post.

7. In an umbrella supporting bracket, a telescoping post comprising:
   (a) an elongated straight inner post member having formed transversely therethrough an elongate slot of a selected width, the longitudinal axis of said slot being parallel to the axis of said inner post member;
   (b) an elongated outer tubular post member adapted to slide upon said inner post member;
   (c) a clamping member having a head and a shank, said shank being formed to pass through said slot and said head being formed with a cross section which is larger than both said shank and slot, and having a fastening means attachable to said shank; and (d) said outer post member having formed therethrough a hole with an entry end and an exit end and oriented with the axis of the hole perpendicular to the axis of said outer post member and positioned such that it can be aligned with said slot, said hole entry end being larger than the head of said clamping member and said hole exit end being larger than said shank and smaller than said head.

8. An umbrella supporting bracket as claimed in claim 3 in which said pair of telescoping post members comprises:

(a) an elongated straight inner post member having formed transversely therethrough an elongate slot of a selected width, the longitudinal axis of said slot being substantially parallel to the major axis of said inner post member;

(b) an elongated outer tubular post member adapted to circumferentially enclose and slide upon said inner post member;

(c) a clamping member having a head and a shank, said shank being of a size to be able to pass through said slot and said head being formed with a cross section which is larger than the width of said slot, and having fastening means attachable to said shank and operative to apply pressure between said head and said fastening means; and (d) said outer post member having formed transversely therethrough a hole with an entry end and an exit end and positioned such that said hole can be aligned with said slot in said inner post member, said hole entry end being larger than the head of said clamping member and said hole exit end being larger than said shank and smaller than said head.

9. An umbrella supporting bracket as claimed in claim 8 wherein said support means is adjustable both laterally and angularly with respect to said post.

10. An umbrella supporting bracket as claimed in claim 8 wherein said support means includes first means for supporting a handle and second means for releasably grasping a shaft of said umbrella.

11. An umbrella supporting bracket as claimed in claim 8 further comprising resilient compressible pad means mounted on the upper and lower ends of said post to respectively engage the lid and the floor of said automobile trunk.

12. An umbrella supporting bracket as claimed in claim 9 further comprising resilient compressible pad means mounted on the upper and lower ends of said post.

13. An umbrella supporting bracket as claimed in claim 10 further comprising resilient compressible pad means mounted on the upper and lower ends of said post.

* * * * *